United States Patent
Roberts et al.

(10) Patent No.: US 10,543,904 B2
(45) Date of Patent: Jan. 28, 2020

(54) SYSTEM AND METHOD FOR FLAPERON AND/OR AILERON CONTROL

(71) Applicant: Bell Helicopter Textron Inc., Fort Worth, TX (US)

(72) Inventors: Brad John Roberts, Fort Worth, TX (US); Jonathan Allen Wasylyszyn, Euless, TX (US); Ron Lorenz Kisor, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 519 days.

(21) Appl. No.: 15/436,225

(22) Filed: Feb. 17, 2017

(65) Prior Publication Data

US 2018/0237124 A1    Aug. 23, 2018

(51) Int. Cl.
*B64C 13/50*     (2006.01)
*B64C 9/00*      (2006.01)
*B64C 29/00*     (2006.01)

(52) U.S. Cl.
CPC .............. *B64C 13/503* (2013.01); *B64C 9/00* (2013.01); *B64C 29/0033* (2013.01); *B64C 2009/005* (2013.01)

(58) Field of Classification Search
CPC .................. B64C 13/503; B64C 2009/005
See application file for complete search history.

(56) References Cited

U.S. PATENT DOCUMENTS

| 3,467,344 | A | 9/1969 | Kramer et al. | |
| 3,848,833 | A | 11/1974 | Rauschelbach | |
| 4,598,890 | A * | 7/1986 | Herzog | B64C 13/503 244/230 |
| 4,649,484 | A * | 3/1987 | Herzog | B64C 13/503 701/3 |
| 4,924,401 | A | 5/1990 | Bice et al. | |
| 9,527,585 | B2 | 12/2016 | Roberts | |
| 2016/0194074 | A1 | 7/2016 | Hagerott et al. | |
| 2016/0272306 | A1 | 9/2016 | Roberts | |
| 2019/0204855 | A1* | 7/2019 | Olsthoorn | B64C 13/503 |

OTHER PUBLICATIONS

European Exam Report in related European Patent Application No. 18155634.1, dated Jun. 15, 2018, 5 pages.
European Search Report in related European Patent Application No. 18155634.1, dated May 25, 2018, 5 pages.

* cited by examiner

*Primary Examiner* — Richard R. Green
*Assistant Examiner* — Michael B. Kreiner
(74) *Attorney, Agent, or Firm* — Lightfoot & Alford PLLC

(57) ABSTRACT

A roll control system controls roll control surfaces of an aircraft that are capable of causing the aircraft to perform a roll maneuver by respectively deflecting in upward and downward directions. The roll control system includes deflection limiter units for respectively limiting angles of deflection of the roll control surfaces, and further includes deflection rate limiter units for respectively limiting rates of deflection of the roll control surfaces. The deflection limiter unit limits the roll control surfaces to deflection distances and deflection rates based at least in part on the deflection direction of the roll control surfaces. For a given set of flight conditions, such as airspeed, if a roll control surface is deflecting upwardly, it is less limited by the roll control system in terms of deflection distance and deflection rate than if the roll control surface is deflecting downwardly.

20 Claims, 4 Drawing Sheets

SYSTEM AND METHOD FOR FLAPERON AND/OR AILERON CONTROL

TECHNICAL FIELD

This disclosure generally relates to flight control systems, and more particularly to Fly-By-Wire (FBW) actuated ailerons and/or flaperons on aircraft.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
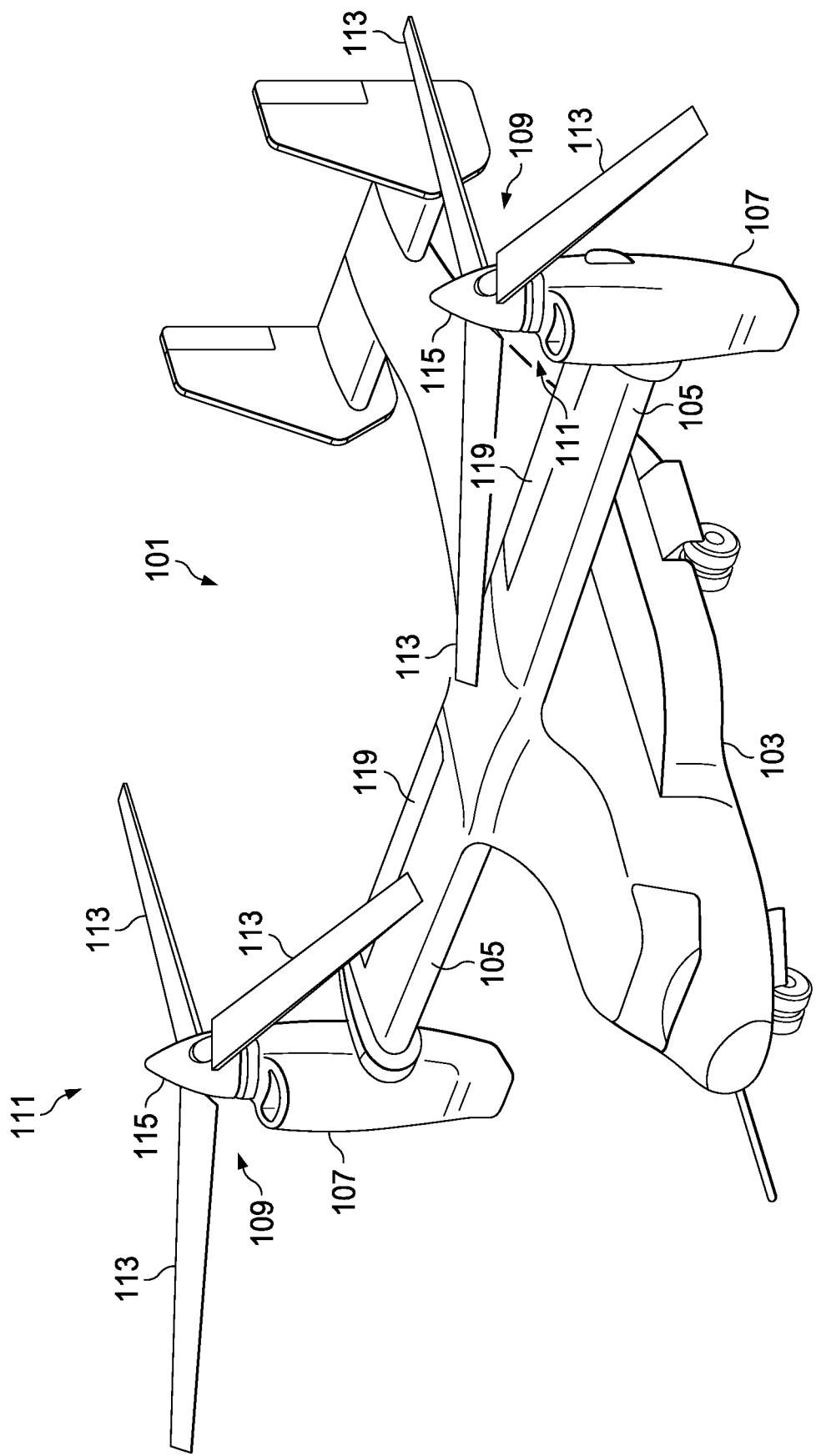
FIG. 1 shows a schematic diagram of an example of a tiltrotor aircraft.

FIG. 1 shows a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and drive train subassemblies 109 for powering rotor systems 111 in rotation. An engine may be an internal combustion engine, an electrical power source and associated motor, or any other suitable means for powering rotor systems 111. Each rotor system 111 is illustrated as having three blades 113. Spinning covers 115 and nacelles 107 substantially enclose drive train subassemblies 109, obscuring drive train subassemblies 109 from view in FIG. 1. The drive train subassemblies 109 can each include a gearbox, shafts, and various couplings.

Wings 105 include respective roll control surfaces 119. In the illustrated embodiment, the roll control surfaces 119 are flaperons. However, depending on the aircraft configuration, flaperons can be used in place of ailerons. Thus, for the sake of simplicity, ailerons and flaperons are referred to herein as roll control surfaces. The roll control surfaces 119 are hinged flight control surfaces that form part of the trailing edge of each of the wings 105. The roll control surfaces 119 are used together to control the aircraft 101 in rolling or banking maneuvers. The aircraft 101 includes a control system for selectively controlling the deflection of the roll control surfaces 119 in order to selectively control rolling or banking of the aircraft 101.

Figure 2:
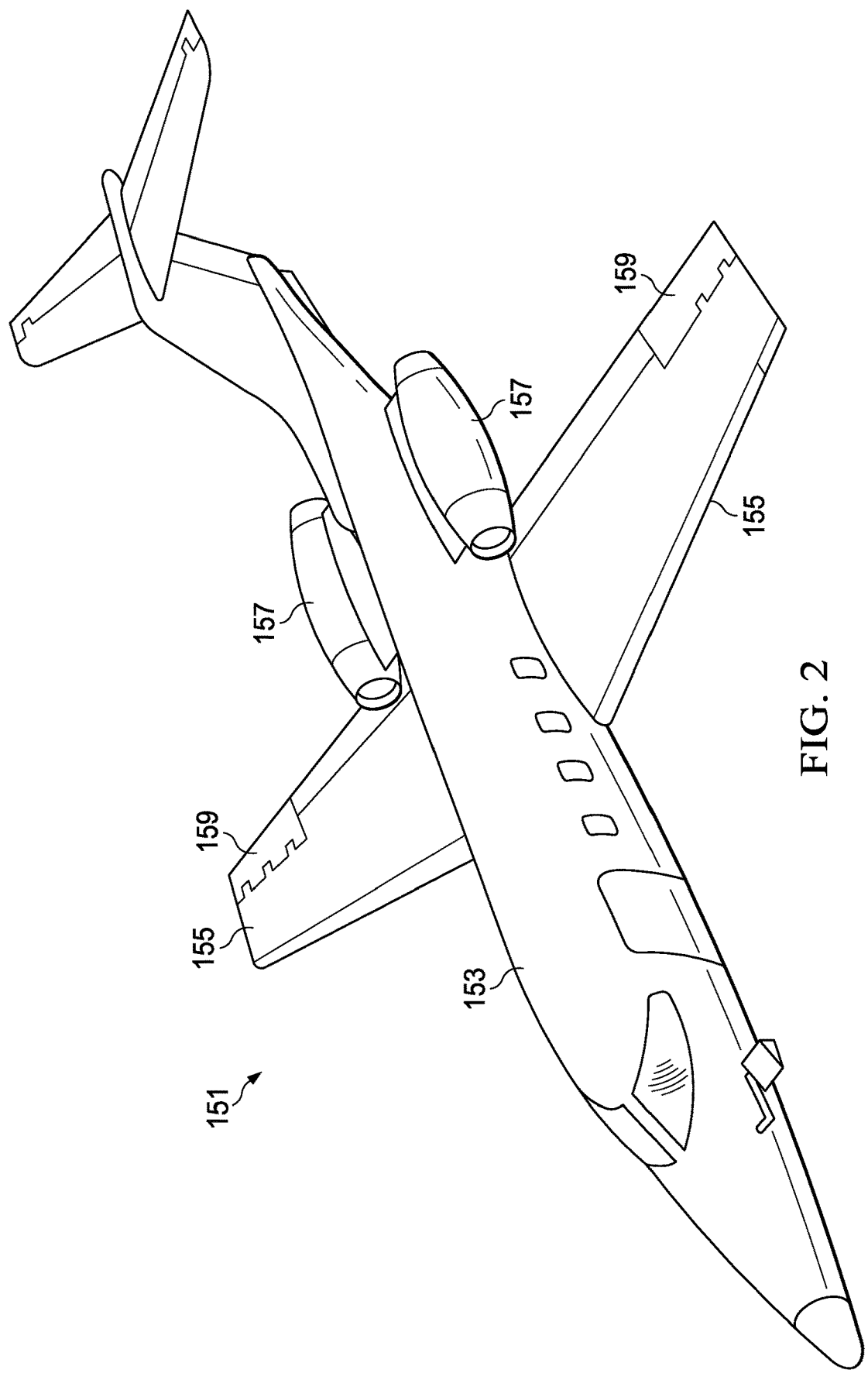
FIG. 2 shows a schematic diagram of an example of a fixed wing aircraft.

Now referring to FIG. 2, aircraft 151 represents a fixed-wing airplane. Aircraft 151 may represent a fixed-wing airplane that features a fuselage 153, wings 155, and engines 157. One or more of the engines 157 may propel the aircraft 151 through the air by generating forward thrust. The wings 155 include respective roll control surfaces 159. The roll control surfaces 159 are hinged flight control surfaces that form part of the trailing edge of each of the wings 155. The roll control surfaces 159 are used together to control the aircraft 151 in rolling or banking maneuvers. The aircraft 151 includes a control system for selectively controlling the deflection of the roll control surfaces 159 in order to selectively control rolling or banking of the aircraft 151.

Teachings of certain embodiments relating to actuation systems described herein may apply to rotor systems 111 and/or other rotor systems, such as non-tilting rotor and helicopter rotor systems. It should also be appreciated that teachings from aircraft 101 may apply to aircraft other than rotorcraft, such as fixed-wing airplanes, such as aircraft 151, and unmanned aircraft, to name a few examples.

Teachings of certain embodiments recognize the capability to improve operation of roll control surfaces, and such teachings apply equally to other similar flight control surfaces including flaperons. As one example, it is known that actuators are commonly used to drive roll control surfaces. During an aircraft design process, winged aircraft that use roll control surfaces for controlling aircraft roll maneuvers are typically designed such that the size of the roll control surfaces and the actuators that move them meet FAA or Mil-Spec roll control quickness criteria. For example, such criteria may require deflecting the roll control surfaces a certain amount and at a certain rate. Actuator rate capability is a function of the load put on the actuator. Higher loading reduces the rate capability of an actuator. If a certain actuator does not meet the rate required under the design load, alternative actuators will typically be tried that have increased capabilities (size, weight, power) until the design criteria is met.

Traditionally, actuators have been sized for a critical load, which in the case of an aileron or flaperon occurs on the surface that is moving trailing edge down because the lift on the upper surface of a wing is trying to pull the surface trailing edge up. The load is proportional to dynamic pressure (airspeed), therefore, higher airspeeds generate higher loads. For a given actuator, load capability dictates that possible deflection angles of the aileron or flaperon surface are reduced as airspeed increases. Traditionally, deflection and rate limits on the commands to the actuators are set to be equal to the actuator capability in the critical downward direction regardless of whether the actuator is actually driving the aileron or flaperon in the downward or upward directions. In other words, these commanded rate and deflection limits have historically been independent of direction. Also, it will thus be appreciated that references herein to up, upward, down, and downward refer to directions relative to the aircraft.

The present disclosure provides for control of roll control surfaces (ailerons and/or flaperons) that takes advantage of additional rate and deflection capability for the roll control surface that is moving in an upward direction (trailing edge deflecting up). The deflection and rate commands are determined based at least upon the direction the roll control surface is moving. Thus, unlike prior flight control systems, the present flight control system accounts for whether the deflection is being made in an upward or downward direction and uses rate and deflection limits that are specifically provided for only upward or only downward deflections. Thus, the presently disclosed flight control system does not artificially limit the deflection distance or deflection rate based on downward-deflection limitations. The roll control surface that is moving trailing edge up is therefore allowed to deflect to the actuators capability based on the aerodynamic load from upward deflection. The present disclosure will thus allow more roll quickness response from an existing actuator/roll control surface design or allow a smaller actuator/roll control surface on a new design to meet performance criteria for an aircraft, such as aircraft 101 or 151.

Figure 3:
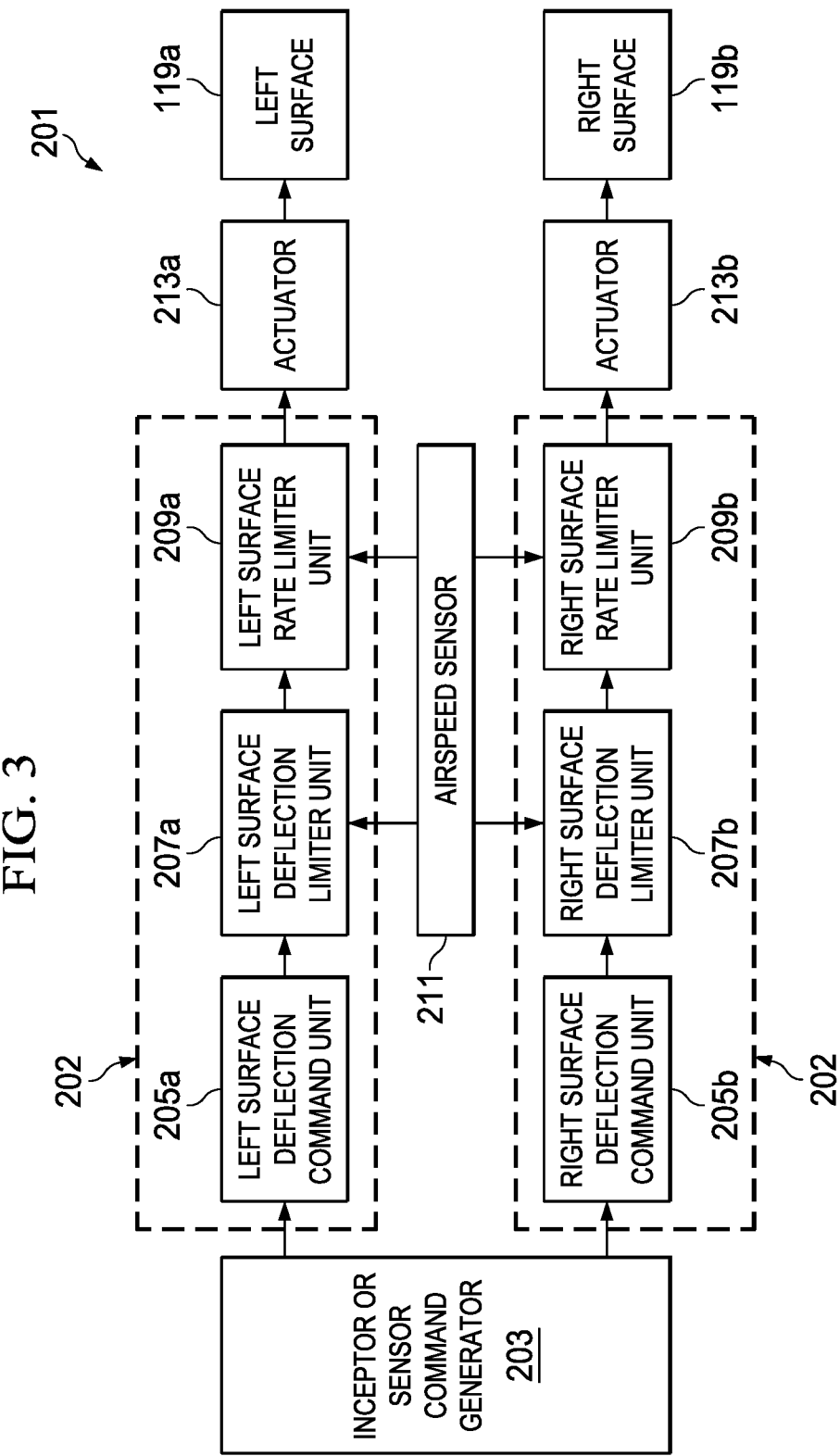
FIG. 3 shows a schematic block diagram of an enhanced roll control surface control system according to an embodiment of the present disclosure.

Referring next to FIG. 3, a schematic block diagram is shown of a roll control system 201 according to an embodiment of the present disclosure. While roll control surfaces 119 are shown in FIG. 3, it should be noted that roll control surfaces 159 can be used in place of roll control surfaces 119 for fixed wing embodiments.

In an aircraft (such as aircraft 101 or aircraft 151) equipped with a Fly-By-Wire (FBW) flight control system, the aircraft will include a roll control system 201. The roll control system 201 includes one or more flight control computers (FCC) 202. The flight control computers 202 operate according to programmed flight control law code. The roll control system 201 is configured to process a roll command (from pilot inceptor or other sensor) into a roll control surface deflection command.

Figure 4:
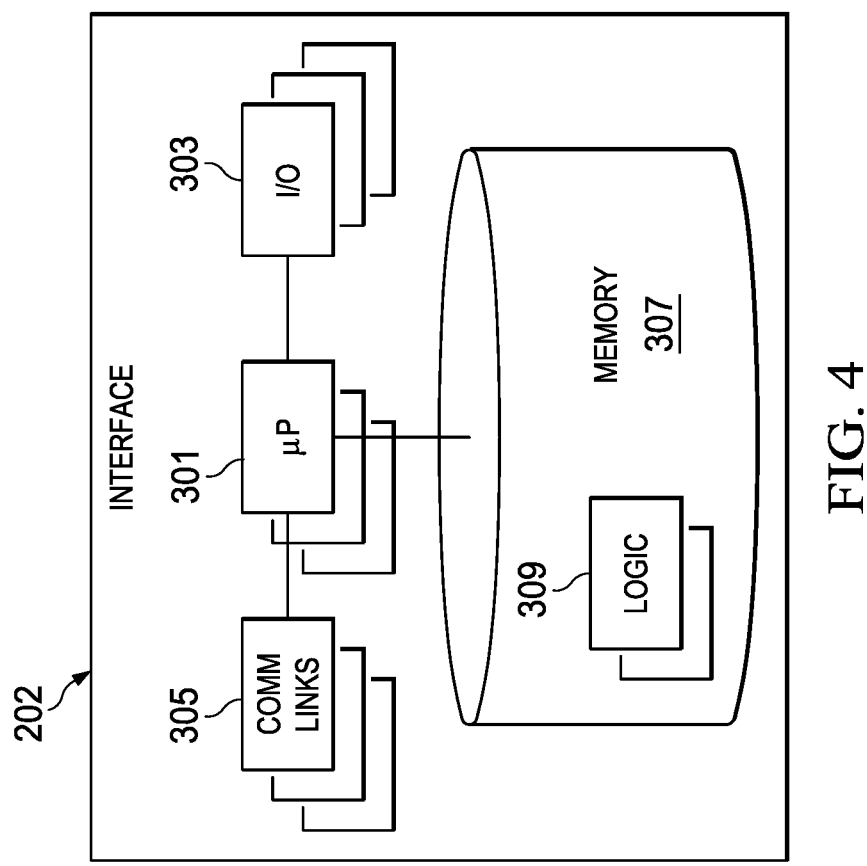
FIG. 4 shows a schematic block diagram of an embodiment of a flight control computer.

Referring to FIG. 4, the flight control computer 202 can include one or more processors 301, input/output (I/O) interfaces 303, communications links 305, and memory 307. In other embodiments, the flight control computer 202 can include more, less, or other components. The flight control computer 202 can be operable to perform one or more operations of various embodiments. Although the embodiment shown provides one example of the flight control computer 202 that can be used with other embodiments, such other embodiments may utilize computers other than the flight control computer 202. Additionally, embodiments may also employ multiple flight control computers 202 or other computers networked together in one or more public and/or private computer networks.

The processors 301 represent devices operable to execute logic contained within a medium. Examples of the processor 301 can include one or more microprocessors, one or more applications, and/or other logic. The flight control computer may include one or multiple processors 301.

The (I/O) interfaces 303 may include any device or interface operable to enable communication between the flight control computer 202 and external components, including communication with a user. Example input/output interfaces 303 can include, but are not limited to, a mouse, keyboard, display (including touch-screen displays), and printers.

The communications links 305 are operable to facilitate communication between the flight control computer 202 and other elements of the aircraft, such as other flight control computers 202, an inceptor or sensor command generator 203, an airspeed sensor 211, actuators 213 (discussed below with reference to FIG. 3), or other systems. The communications links 305 can connect to any number and combination of wireline and/or wireless networks, data buses, data transmission conduits, electrical buses, and/or electrical conduits suitable for data and/or electrical signal transmission, including transmission of communications and electricity. The communication links 305 can, for example, communicate audio and/or video signals, electrical voltages and/or currents, internet protocol packets, frame relay frames, asynchronous transfer mode cells, and/or other suitable data between network addresses. The communications links 305 can be configured to connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

The memory 307 represents any suitable storage medium and may store any data for use by the flight control computer 202. The memory 307 can include one or more tangible, computer-readable, and/or computer-executable storage mediums. Examples of the memory 307 can include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable mediums.

In some embodiments, the memory 307 stores logic 309. Logic 309 facilitates operation of the flight control computer 202. Logic 309 can include hardware, software, and/or other logic. Logic 309 may be encoded in one or more tangible, non-transitory media and may perform operations when executed by a computer. Logic 309 can include a computer program, software, computer executable instructions, and/or instructions capable of being executed by the flight control computer 202. Example logic 309 can include any of the well-known OS2, UNIX, Mac-OS, Linux, and Windows Operating Systems or other operating systems. In particular embodiments, the operations of the embodiments, including the operations discussed in connection with the roll control system 201 shown in FIG. 3, can be performed by one or more processors 301 based at least in part on logic 309 instructions stored in a computer readable media storing, embodied with, and/or encoded with a computer program and/or having a stored and/or an encoded computer program. Logic 309 may also be embedded within any other suitable medium without departing from the scope of the invention. The memory 307 can also store data, such as schedules and/or look-up tables used for operation of the roll control system 201 as discussed below with reference to FIG. 3.

Referring again to FIG. 3, the roll control system 201 includes a pilot inceptor or sensor command generator 203 for issuing the initial instruction for the aircraft to perform a roll maneuver. For example, pilot control of the pilot inceptor 203 can result in a roll signal being transmitted from the inceptor 203 to the flight control computers 202. The roll signal received by the flight control computers 202 is interpreted as roll control surface deflection commands. More specifically, the flight control computers 202 includes deflection command units 205a, 205b to convert the received roll signal into a left surface deflection command signal and a right surface deflection command signal, respectively. For a roll command, the left and right roll control surfaces will deflect in opposite directions. Thus, the left roll control surface deflection command signal will be representative of an UP deflection or a DOWN deflection, while the right roll control surfaces deflection command signal will be representative of the opposite deflection direction, either DOWN or UP.

The angular distance of the deflections represented by the deflection command signals from the deflection command units 205a, 205b are then limited at deflection limiter units 207a, 207b, respectively. For example, an aircraft can be configured such that the roll control surfaces are only to deflect from 0° to 25° upward and from 0° to 65° downward. The deflection limiter units 207a, 207b prevent the deflection commands signals from exceeding these limits. The angular distance of the deflections are also limited based on airspeed data, for example received from one or more airspeed sensors 211. Roll control surfaces are limited based on a "blow down" limit, which refers to the angular deflection that the roll control surface is capable of at a given airspeed. In general, the greater the airspeed, the greater the amount of force required by the actuator to drive the roll control surface DOWN. Thus, the deflection limiter units 207a, 207b check and verify that the requested angular deflection is within limits based on airspeed data received from airspeed sensors 211. For example, the deflection limiter units 207a, 207b can include or have access to schedules or look-up tables that include deflection limits for given airspeeds.

The deflection-angle-limited deflection commands from deflection limiter units 207a, 207b are then further processed and are rate-limited at deflection rate limiter units 209a, 209b, respectively. The rate at which the actuators can move the roll control surfaces is limited by the force exerted against the roll control surfaces, which is a function of the airspeed of the aircraft. Thus, the greater the airspeed, the greater the amount of force required by the actuator to drive the roll control surfaces DOWN at a given deflection rate. Thus, the deflection rate limiter units 209a, 209b check and verify that angular deflection rate at which the actuators will deflect the roll control surfaces is within limits based on airspeed data received from airspeed sensors 211. For example, the deflection rate limiter units 209a, 209b can include schedules or look-up tables that include deflection limits for given airspeeds.

The deflection commands, now distance and rate limited, are then further processed from deflection commands to signals that can be used to drive the actuators 213a, 213b. For example, the drive signals can be digitally encoded signals or electrical signals having voltage and/or current levels corresponding to the distance and rate limited deflection commands.

The actuators 213a, 213b are mechanically linked to aircraft roll control surfaces 119a, 119b, which can be surfaces of an aileron or flaperon depending on which of these is provided on the aircraft. Thus, as noted above, "roll control surfaces" as referenced herein include flaperons and/or ailerons. The actuators 213a, 213b, having thus received the actuator drive signals, extend or retract to move the respective roll control surfaces 119a, 119b to the commanded position at the commanded rate.

As discussed above, the deflection in the DOWN direction is more taxing on the actuators 213a, 213b than the deflection in the UP direction. Thus, the deflection limiter units 207a, 207b and the deflection rate limiter units 209a, 209b set deflection and rate limits based on whether the aileron or flaperon is being deflected UP or DOWN. If the aileron or flaperon is being deflected in the DOWN direction, the deflection and rate will be more limited than if the aileron or flaperon is being deflected in the UP direction. In a typical roll maneuver, one of the roll control surfaces 119a, 119b will be deflected UP while the other is deflected DOWN. Since the roll control system 201 allows the roll control surface being deflected UP to be less limited in terms of deflection distance and/or deflection rate, the roll control surface 119a or 119b that is being deflected in the UP direction can deflect to a greater degree and faster than the other of the roll control surfaces 119a, 119b that is being deflected in the DOWN direction. As a result, the aircraft can perform the roll maneuver more quickly than if both roll control surfaces 119a, 119b were subject to the same constraints (deflection angle and deflection rate).

Thus, the roll control system 201 allows for improved aircraft roll performance using a given set of actuators 213 by providing for aileron and flaperon control that takes advantage of additional rate and deflection capability for the roll control surfaces that is moving in an upward direction (trailing edge deflecting up). The roll control system 201 determines deflection and rate command limits based at least upon the direction the roll control surfaces is moving, and therefore allows the roll control surface moving upward to deflect further and more quickly than the roll control surface moving downward. In this way, the roll control system 201 will allow more roll quickness response from a given actuator/roll control surface design or allow a smaller actuator/roll control surface on a new design to meet performance criteria for an aircraft, such as aircraft 101 or 151.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Also, the phrases "at least one of A, B, and C" and "A and/or B and/or C" should each be interpreted to include only A, only B, only C, or any combination of A, B, and C.

What is claimed is:

1. A roll control system for controlling first and second roll control surfaces of an aircraft that are capable of causing the aircraft to perform a roll maneuver by respectively deflecting in upward and downward directions, the roll control system including:
   a first deflection limiter unit for limiting an angle of deflection of the first roll control surface;
   a second deflection limiter unit for limiting an angle of deflection of the second roll control surface;
   a first deflection rate limiter unit for limiting a rate of deflection of the first roll control surface; and
   a second deflection rate limiter unit for limiting a rate of deflection of the second roll control surface;
   wherein the first deflection limiter unit limits the first roll control surface to a first deflection distance based at least in part on whether the first roll control surface is deflecting upwardly or downwardly, and
   wherein the first deflection rate limiter unit limits the first roll control surface to a first deflection rate based at least in part on whether the first roll control surface is deflecting upwardly or downwardly.

2. The roll control system of claim 1, wherein the second deflection limiter unit limits the second roll control surface to a second deflection distance based at least in part on whether the second roll control surface is deflecting upwardly or downwardly.

3. The roll control system of claim 1, wherein the second deflection rate limiter unit limits the second roll control surface to a second deflection rate based at least in part on whether the second roll control surface is deflecting upwardly or downwardly.

4. The roll control system of claim 1, wherein the first deflection limiter unit limits the first roll control surface to a first deflection distance based at least in part on a sensed airspeed.

5. The roll control system of claim 1, wherein the first deflection rate limiter unit limits the first roll control surface to a first deflection rate based at least in part on a sensed airspeed.

6. The roll control system of claim 1, wherein the first deflection rate limiter unit allows the first roll control surface to move at a first deflection rate if the first roll control surface is deflecting upwardly, and allows the first roll control surface to move at a second rate that is slower than the first rate if the first roll control surface is deflecting downwardly.

7. An aircraft, comprising:
first and second roll control surfaces; and
a roll control system for controlling the first and second roll control surfaces to cause the aircraft to perform a roll maneuver by respectively controlling the first and second roll control surfaces to deflect in upward and downward directions, the roll control system including:
a first deflection limiter unit for limiting an angle of deflection of the first roll control surface;
a second deflection limiter unit for limiting an angle of deflection of the second roll control surface;
a first deflection rate limiter unit for limiting a rate of deflection of the first roll control surface; and
a second deflection rate limiter unit for limiting a rate of deflection of the second roll control surface;
wherein the first deflection limiter unit limits the first roll control surface to a first deflection distance based at least in part on whether the first roll control surface is deflecting upwardly or downwardly, and
wherein the first deflection rate limiter unit limits the first roll control surface to a first deflection rate based at least in part on whether the first roll control surface is deflecting upwardly or downwardly.

8. The aircraft of claim 7, wherein the second deflection limiter unit limits the second roll control surface to a second deflection distance based at least in part on whether the second roll control surface is deflecting upwardly or downwardly.

9. The aircraft of claim 7, wherein the second deflection rate limiter unit limits the second roll control surface to a second deflection rate based at least in part on whether the second roll control surface is deflecting upwardly or downwardly.

10. The aircraft of claim 7, further comprising an airspeed sensor for sensing an airspeed of the aircraft.

11. The aircraft of claim 10, wherein the first deflection limiter unit is configured to receive the airspeed from the airspeed sensor and for limiting the first roll control surface to a first deflection distance based at least in part on the airspeed.

12. The aircraft of claim 10, wherein the first deflection rate limiter unit is configured to receive the airspeed from the airspeed sensor and for limiting the first roll control surface to a first deflection rate based at least in part on the airspeed.

13. The aircraft of claim 7, wherein the aircraft further comprises first and second wings, and wherein the first roll control surface is attached to the first wing and the second roll control surface is attached to the second wing.

14. The aircraft of claim 7, wherein the aircraft further comprises first and second actuators, and wherein the first roll control surface is attached to and deflected by the first actuator, and the second roll control surface is attached to and deflected by the second actuator.

15. The aircraft of claim 7, wherein the first deflection rate limiter unit allows the first roll control surface to move at a first deflection rate if the first roll control surface is deflecting upwardly, and allows the first roll control surface to move at a second rate that is slower than the first rate if the first roll control surface is deflecting downwardly.

16. A roll control system for controlling first and second roll control surfaces of an aircraft that are capable of causing the aircraft to perform a roll maneuver by respectively deflecting in upward and downward directions, the roll control system including:
a first deflection limiter unit for limiting an angle of deflection of the first roll control surface;
a second deflection limiter unit for limiting an angle of deflection of the second roll control surface;
a first deflection rate limiter unit for limiting a rate of deflection of the first roll control surface; and
a second deflection rate limiter unit for limiting a rate of deflection of the second roll control surface;
wherein the first deflection limiter unit limits the first roll control surface to a first deflection distance and the second deflection limiter unit limits the second roll control surface to a second deflection distance, and
wherein the first deflection rate limiter unit limits the first roll control surface to a first deflection rate based at least in part on whether the first roll control surface is deflecting upwardly or downwardly, and the second deflection rate limiter unit limits the second roll control surface to a second deflection rate based at least in part on whether the first roll control surface is deflecting upwardly or downwardly.

17. The roll control system of claim 16, wherein the first deflection limiter unit limits the first roll control surface to a first deflection distance based at least in part on a sensed airspeed and at least in part on whether the second roll control surface is deflecting upwardly or downwardly.

18. The roll control system of claim 16, wherein the second deflection limiter unit limits the second roll control surface to a second deflection distance based at least in part on a sensed airspeed and based at least in part on whether the second roll control surface is deflecting upwardly or downwardly.

19. The roll control system of claim 16, wherein the first deflection rate limiter unit limits the first roll control surface to a first deflection rate based at least in part on a sensed airspeed, and wherein the second deflection rate limiter unit limits the second roll control surface to a second deflection rate based at least in part on the sensed airspeed.

20. The roll control system of claim 16, wherein the first deflection rate limiter unit allows the first roll control surface to move at a first deflection rate if the first roll control surface is deflecting upwardly, and allows the first roll control surface to move at a second rate that is slower than the first rate if the first roll control surface is deflecting downwardly.

* * * * *